(12) United States Patent
Jothiswaran et al.

(10) Patent No.: US 9,367,898 B2
(45) Date of Patent: Jun. 14, 2016

(54) ORIENTATION OF DISPLAY RENDERING ON A DISPLAY BASED ON POSITION OF USER

(71) Applicant: INTEL CORPORATION, Santa Clara, CA (US)

(72) Inventors: Gangatharan Jothiswaran, Bangalore (IN); Ram Mohan Gupta, Bangalore (IN); Prasanna Krishnaswamy, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 182 days.

(21) Appl. No.: 14/128,321

(22) PCT Filed: Oct. 29, 2013

(86) PCT No.: PCT/US2013/067327
§ 371 (c)(1),
(2) Date: Dec. 20, 2013

(87) PCT Pub. No.: WO2015/034542
PCT Pub. Date: Mar. 12, 2015

(65) Prior Publication Data
US 2015/0278998 A1    Oct. 1, 2015

(30) Foreign Application Priority Data

Sep. 9, 2013    (IN) .......................... 2658/DEL/2013

(51) Int. Cl.
*G06T 3/60* (2006.01)
*G06F 3/16* (2006.01)
*G06F 3/14* (2006.01)

(52) U.S. Cl.
CPC ... *G06T 3/60* (2013.01); *G06F 3/14* (2013.01); *G06F 3/167* (2013.01)

(58) Field of Classification Search
None
See application file for complete search history.

(56) References Cited

U.S. PATENT DOCUMENTS

| 2002/0069054 A1* | 6/2002 | Arrowood | ........... G10L 21/0208 |
| | | | 704/233 |
| 2002/0149613 A1 | 10/2002 | Gutta et al. | |

FOREIGN PATENT DOCUMENTS

| JP | 06-141309 A | 5/1994 |
| JP | 2001-228848 A | 8/2001 |

(Continued)

OTHER PUBLICATIONS

International Search Report and Written Opinion mailed Jun. 9, 2014 for International Application No. PCT/US2013/067327, 13 pages.

(Continued)

*Primary Examiner* — Maurice L McDowell, Jr.
(74) *Attorney, Agent, or Firm* — Schwabe, Williamson & Wyatt, P.C.

(57) ABSTRACT

Apparatus, computer-readable storage medium, and method associated with orienting a display image are described. In embodiments, a computing device may include a display to render the display image and a display orientation module coupled with the display. In embodiments the display orientation module may receive audio input from a user of the computing device and determine a position of the user relative to the display, based on the audio input. In embodiments, the display orientation module may further either orient the display image in accordance with the position of the user or output a result of the determination for use to orient the display image in accordance with the position of the user. Other embodiments may be described and/or claimed.

24 Claims, 6 Drawing Sheets

(56) References Cited

FOREIGN PATENT DOCUMENTS

| KR | 10-2011-0093464 A | 8/2011 |
| KR | 10-2012-0057275 A | 6/2012 |

OTHER PUBLICATIONS

International Preliminary Report on Patentability mailed Mar. 24, 2016 for International Application No. PCT/ US2013/067327, 10 pages.

* cited by examiner

ORIENTATION OF DISPLAY RENDERING ON A DISPLAY BASED ON POSITION OF USER

CROSS REFERENCE TO RELATED APPLICATIONS

The present application is a national phase entry under 35 U.S.C. §371 of International Application No. PCT/US2013/067327, filed Oct. 29, 2013, entitled "ORIENTATION OF DISPLAY RENDERING ON A DISPLAY BASED ON POSITION OF USER", which claims priority to Indian Patent Application No. 2658/DEL/2013, filed Sep. 9, 2013, entitled "ORIENTATION OF DISPLAY RENDERING ON A DISPLAY BASED ON POSITION OF USER." PCT/US2013/067327 designated, among the various States, the United States of America. The Specification of the PCT/US2013/067327 Application is hereby incorporated by reference.

TECHNICAL FIELD

Embodiments of the present disclosure are related to the field of data processing, and in particular, to display image orientation based on position of a user.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Computer display technology is continually advancing making it possible to manufacture thinner and lighter displays, such as, for example, liquid crystal displays (LCDs) or organic light emitting diode (OLED) displays. Because of these advances displays are becoming more prevalent in all manner of computing devices and are now able to be placed in locations and devices that would have been impermissible with traditional cathode ray tube (CRT) displays. As a result, users are interacting with these displays in new settings and situations. To be able to interact with the displays the orientation of any image rendered on the display may need to be oriented with respect to the user. With current display technology; however, a user must physically interact with a display or must manually adjust software settings to adjust the display image orientation of the display.

DETAILED DESCRIPTION OF ILLUSTRATIVE EMBODIMENTS

A method, storage medium, and computing device for display image orientation are described. In embodiments, the computing device may include a display to render a display image; and a display orientation module coupled with the display. In embodiments the display orientation module may be configured to receive audio input from a user of the computing device. The display orientation module may then determine a position of the user relative to the display, based on the audio input. The display orientation module may then either orient the display image in accordance with the position of the user or output a result of the determination for use to orient the display image in accordance with the position of the user or.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
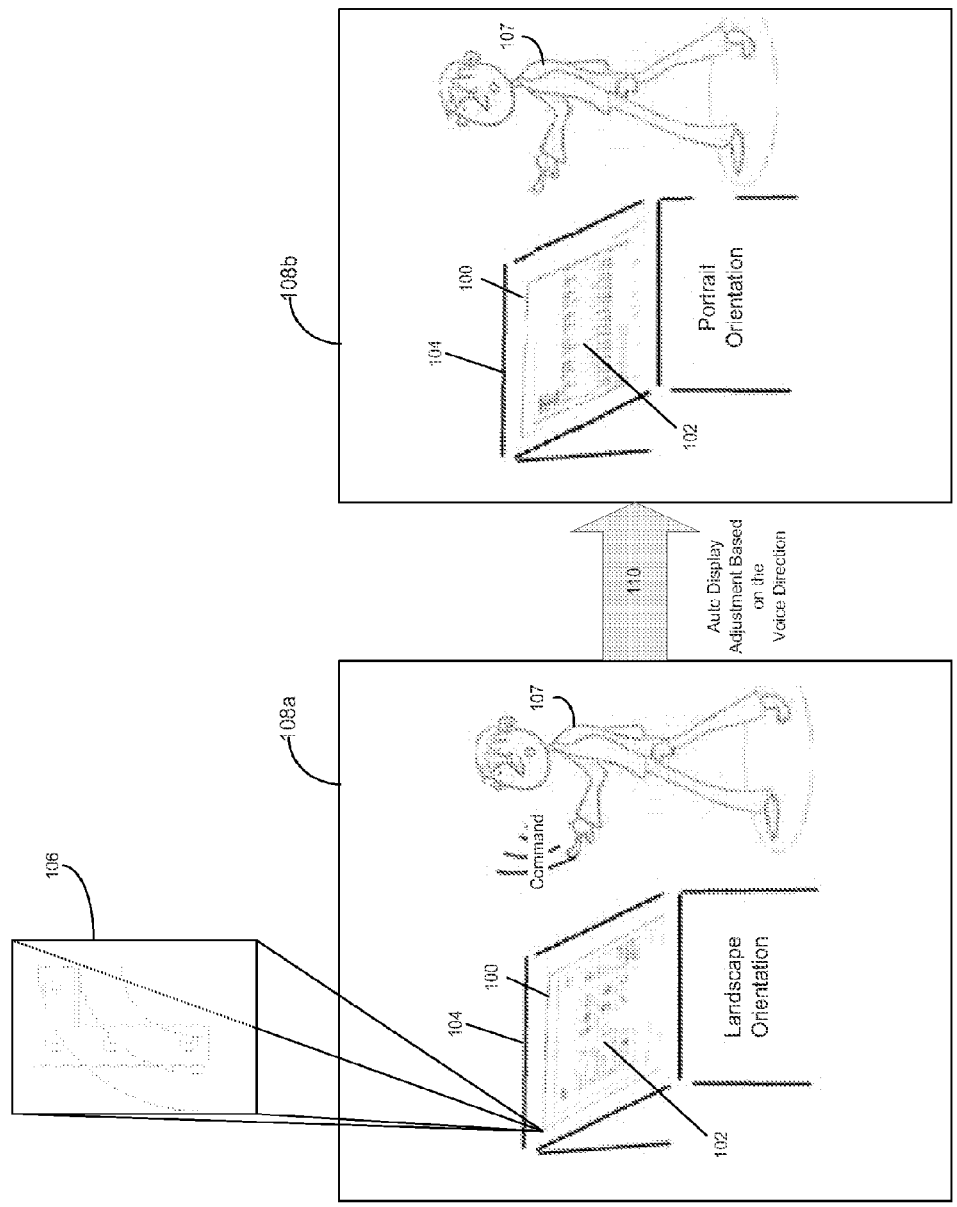
FIG. 1 depicts an illustrative environment in which some embodiments of the present disclosure may be practiced.

FIG. 1 depicts an illustrative environment in which some embodiments of the present disclosure may be practiced. As depicted by 108a, user 106 may approach a computing device, such as kiosk 104. Kiosk 104 may be comprised of a processor (not shown), and one or more peripherals, including but not limited to, a display 100 and a microphone array 106. Display 100 may be configured to render a display image 102 in a number of different display image orientations. For example, as depicted in 108a, the display image has been rendered in a landscape orientation prior to the user approaching kiosk 104.

Upon arriving at kiosk 104, or while approaching kiosk 104, user 106 may issue audio input directed towards kiosk 104, such as a voice command. In embodiments, the voice command may be a specific voice command associated with display image orientation, such as, for example, "rotate." In other embodiments the voice command may be a generic command directed at functionality other than the display image orientation, such as, for example, a command to open an application or perform an internet search. Upon receiving the voice command, regardless of whether the voice command is specific or generic, kiosk 104 may be configured to utilize microphone array 106 to determine a location of the user with respect to display 100 based upon the direction from which the voice command was given. Once the location of the user has been determined by kiosk 104, the display image orientation may be automatically adjusted based upon the determined location of the user, as depicted by arrow 110. As seen in 108b the display image orientation has been adjusted so that display image 102 is now rendered in a portrait orientation, thus allowing the user to have the display oriented in the user's direction without any manual adjustment of the display.

Figure 2:
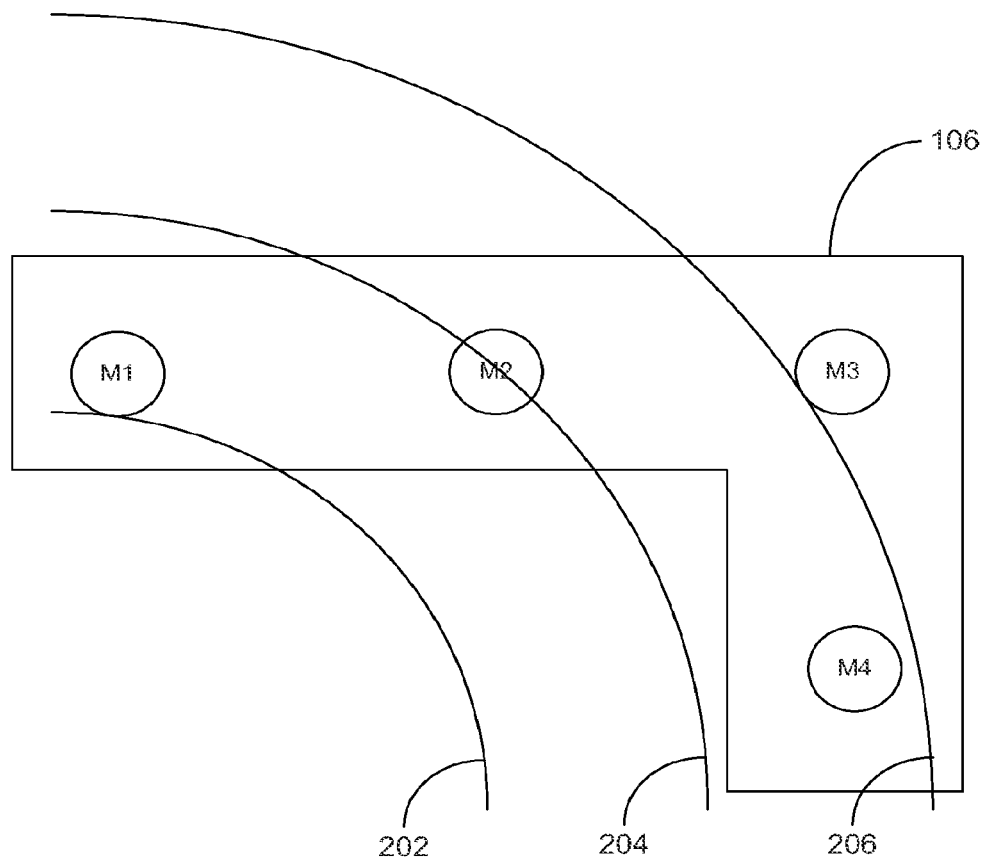
FIG. 2 depicts an illustrative microphone array according to some embodiments of the present disclosure.

FIG. 2 depicts an illustrative microphone array 106 according to some embodiments of the present disclosure. In embodiments, microphone array 106 may include a number of individual microphones each configured to capture individual audio streams for processing. As depicted here, microphone array 106 may be comprised of 4 individual microphones M1-M4. It will be appreciated; however, that the four microphones depicted here are merely meant to be illustrative and that microphone array 106 may include any number of microphones whose audio streams may be sufficient to determine the location of a user. For example, if kiosk 104 of FIG. 1 were placed in a corner of a room such that it could only be approached from two directions, two microphones may be sufficient to determine a location of the user with enough accuracy to orient the display. In some embodiments a higher level of accuracy in determining the location of the user may be desired and a greater number of microphones may be utilized to achieve the higher level accuracy.

As depicted in FIG. 2, in some embodiments, microphone array 106 may be disposed in an L shaped orientation; however, this disclosure is not intended to be limited to such embodiments. Any disposition or orientation of microphones in a microphone array whose audio streams may be sufficient to determine the location of a user is contemplated by this disclosure. For example, if kiosk 104 of FIG. 1 were located in such a way that it could only be approached from two opposite sides a linear 2 microphone array may be sufficient to determine the user's location. In embodiments where a more precise location may be necessary other orientations may be chosen for the microphone array.

The audio streams from microphones M1-M4 of microphone array 106 may be utilized to determine the location of the user by analyzing a time delay and/or amplitude difference with respect to one another. For example, consider audio wave-fronts 202-206. Audio wave-fronts 202-206 may be utilized to determine the position of the user by determining when the individual microphones capture audio wave-fronts 202-206 through an analysis of the audio streams captured by the individual microphones M1-M4. As depicted here, audio wave-fronts 202-206 arrive at microphone M1 first, followed by microphone M2, then microphone M4 and finally microphone M3. When analyzed by a computing device, such as kiosk 104 or computing device 500 of FIG. 5 below, the order and delay with which the audio wave-fronts reach the individual microphones may indicate the direction from which the sound originated, and thus may be used to determine the user's location with respect to the microphone array. In other embodiments, amplitude may be utilized in addition to, or in place of, a time delay. For instance, the microphone reached first by audio wave-fronts 202-206 may record the highest amplitude while each microphone the audio wave-fronts 202-206 reach thereafter may record a lower amplitude and thus a measure of amplitude from each individual microphone may be able to be utilized in some embodiments to determine a sequence in which an audio wave-front reaches the microphone array and thus may indicate position of a user in a similar manner to that described above with respect to the time delay.

While depicted here as only being implemented in two dimensions, it will be appreciated that a three dimensional microphone array may be utilized in some embodiments. Such a microphone array could be utilized to determine a user's position in a three dimensional space. A user's position in a three dimensional space could be utilized in embodiments having a display capable of rendering an image in three dimensions. In embodiment's where a three dimensional display may be combined with a three dimensional microphone array, it will be appreciated that the three dimensional display image may be oriented in all three dimensions based upon the user's position. In addition, in embodiments where a three dimensional microphone may be utilized with a display capable of rendering in two dimensions, the display itself could be adjusted in the third dimension while the display image is adjusted in the other two dimensions. For example, the display itself may be raised, lowered, turned, and/or tilted based upon the user's position as determined when utilizing a three dimensional microphone array.

Figure 3:
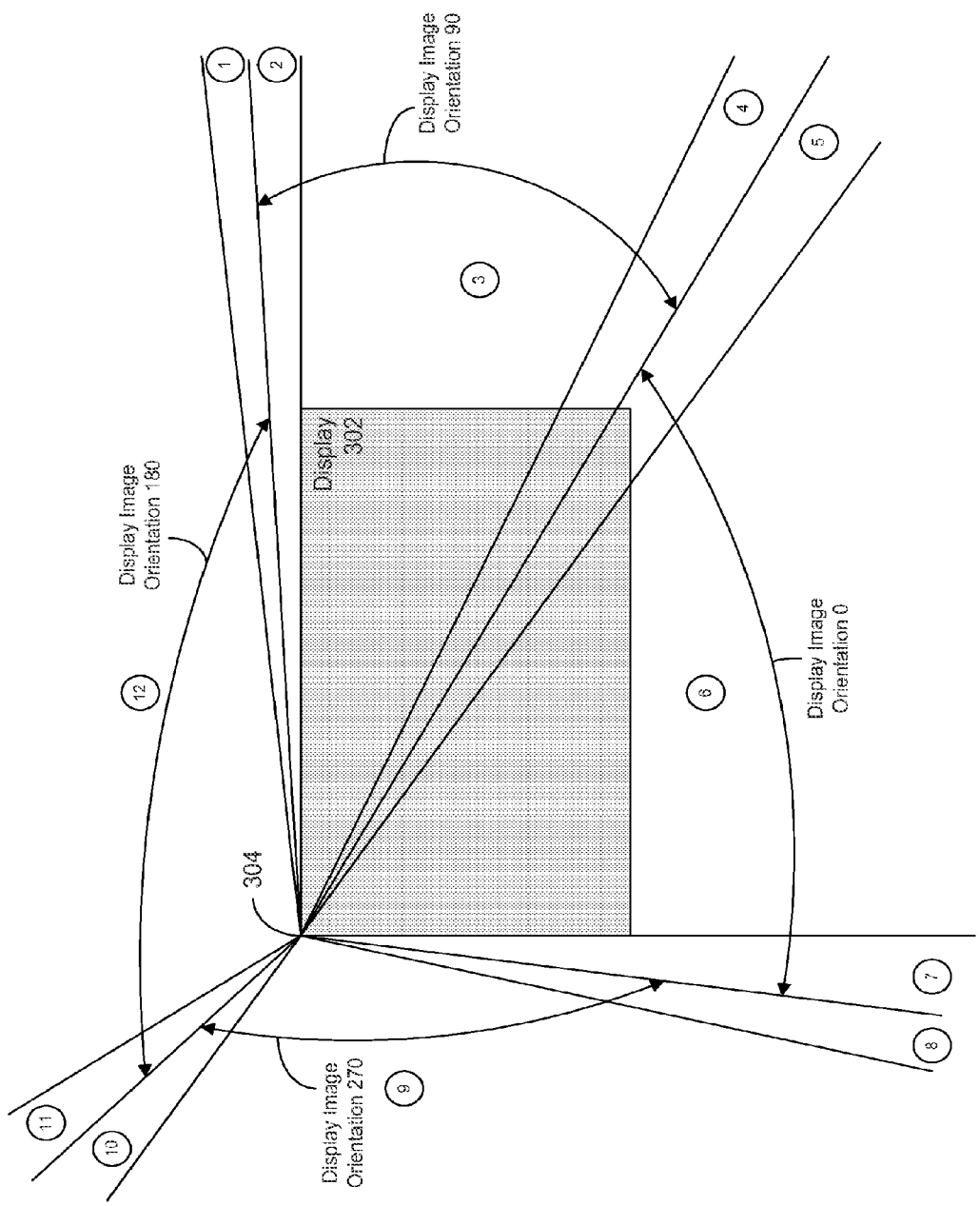
FIG. 3 depicts a representation of an illustrative placement of a microphone array disposed on a display with corresponding zones associated with display image orientations.

FIG. 3 depicts a representation of an illustrative placement of a microphone array 304 disposed on display 302 with corresponding zones associated with display image orientations. Each of the four display image orientations depicted may be comprised of one unambiguous zone and two ambiguous zones. For example, display image orientation 90 is comprised of zones 2, 3 and 4 with zone 3 being the unambiguous zone and zones 2 and 4 being ambiguous zones. As used herein, an ambiguous zone is a zone in which it may be difficult to determine the exact side of the display at which the user is located, while an unambiguous zone is a zone in which the exact side of the display at which the user is located may be more clearly determined. The handling of commands received from ambiguous zones and unambiguous zones is discussed in greater detail below in reference to FIG. 4.

As depicted herein, the zones may have a nexus at microphone array 304. It will be appreciated that the placement of the microphone array may determine the location of the ambiguous zones and the unambiguous zones. Therefore, in some embodiments, the microphone array may be placed in other locations relative to the display to reduce the impact of ambiguous zones. It will further be appreciated that the use of more than one microphone array may be utilized in an effort to reduce the impact of the ambiguous zones. Any such placement of microphone array 304 or integration of one or more additional microphone arrays is specifically contemplated by this disclosure.

In some embodiments, a computing device may be configured to treat a voice command from an ambiguous zone differently than that of a voice command received from an unambiguous zone. In some embodiments, when a voice command is received by a computing device, such as, for example, kiosk 104 of FIG. 1, the computing device may be configured to determine if the voice command originated from an ambiguous zone. If the voice command originated from an ambiguous zone, the computing device may be configured to select a default display image orientation corresponding to that ambiguous zone. After the default display image orientation is selected, the computing device may be configured to adjust the display image orientation if another voice command is received from an ambiguous zone within a predetermined period of time. If another voice command is received from an ambiguous zone within the predetermined period of time, the computing device may be configured to adjust the display image orientation to a different display image orientation. This embodiment may be based on an assumption that if a first voice command is received from an ambiguous zone and a second voice command is received from an ambiguous zone in quick succession to the first voice command, that the default selected display orientation is incorrect and an adjustment may be necessary. In some embodiments, the different display image orientation may be adjacent to the previously selected display image orientation.

Figure 4:
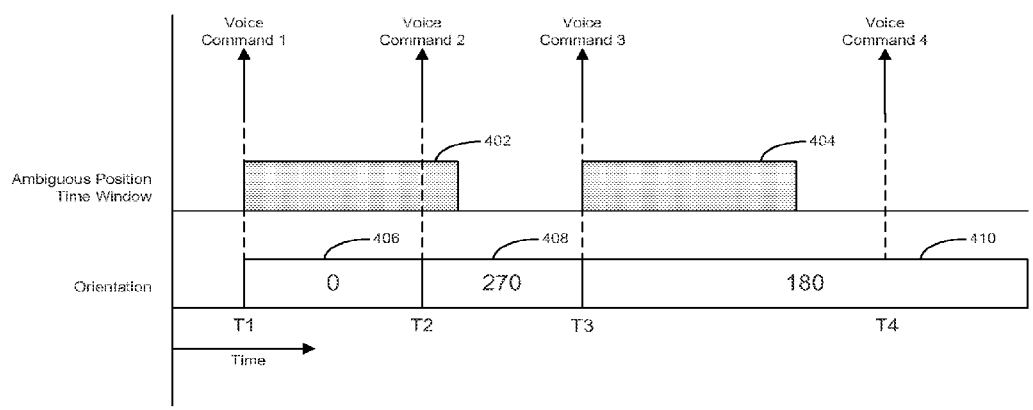
FIG. 4 depicts an illustrative graph representing the treatment of voice commands received in ambiguous and unambiguous zones

FIG. 4 depicts an illustrative graph representing the treatment of voice commands received in ambiguous and unambiguous zones, such as the zones depicted in FIG. 3, above. The horizontal axis represents time and the upper horizontal axis represents ambiguous time windows while the lower horizontal axis represents display image orientation. At time T1 voice command 1 may be received by a computing device. In this example, the computing device may determine that voice command 1 originated in ambiguous zone 7 of FIG. 3. As a result, the default display image orientation would be display image orientation 0 as represented in 406. Because voice command 1 was determined to be from an ambiguous zone, the computing device may be configured to initiate ambiguous position time window 402.

At time T2, voice command 2 may also be received from an ambiguous zone by the computing device. In addition, as depicted herein, time T2 is within ambiguous position time window 402. As a result, upon receiving voice command 2, the computing device may be configured to adjust the display image orientation to a display image orientation adjacent to the ambiguous zone, as indicated in the transition from box 406 as a display image orientation of 0 to box 408 with a display image orientation of 270.

At time T3, voice command 3 may be received by the computing device. Voice command 3 is again received from an ambiguous zone, as indicated by the initiation of ambiguous position time window 404 by the computing device. Because voice command 3 was received from an ambiguous zone and the default display image orientation is 180, as indicated by 410, it may have been received from either of zones 1 or 11 as depicted in FIG. 3. As depicted here, no other voice command is received from an ambiguous zone within ambiguous position time window 404 and therefore no further change may be necessary to the display image orientation.

At time T4, voice command 4 may be received by the computing device. As depicted here, voice command 4 may not be received from an ambiguous zone because no ambiguous position time window is initiated by the computing device. Furthermore, because the display image orientation remains at 180 in box 410 it may be determined from the graph that voice command 4 is received from zone 12 of FIG. 3.

Figure 5:
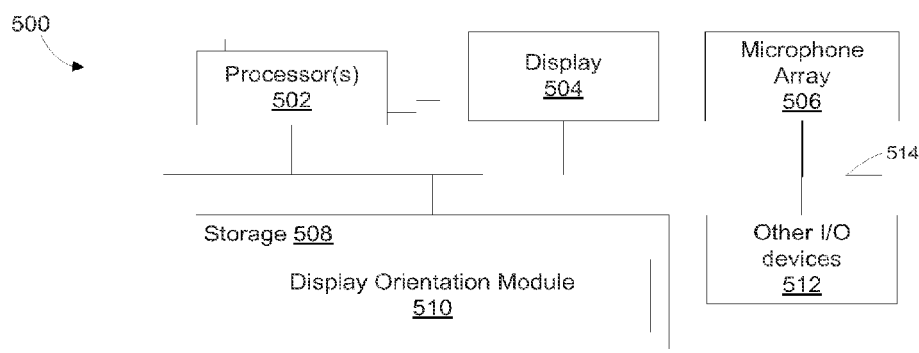
FIG. 5 depicts an illustrative computing device according to some embodiments of the present disclosure.

FIG. 5 depicts an illustrative configuration of a computing device 500 according to some embodiments of the disclosure. Computing device 500 may be any type of computing device including a portable computing device, such as a smart phone, tablet, ultrabook, ebook, laptop computer, etc., or a stationary computing device, such as a desktop computer or kiosk computing device, such as kiosk 104 of FIG. 1. It will be appreciated that the computing devices mentioned above are merely examples that are meant to be illustrative. This disclosure is equally applicable regardless of the computing device's form.

Computing device 500 may comprise processor(s) 502, display 504, microphone array 506, storage 508 containing display orientation module 510, and other input/output (I/O) devices 512. Processor(s) 502, display 504, microphone array 506, storage 508 and other input/output (I/O) devices 512 may all be coupled together utilizing system bus 514.

Processor(s) 502 may be comprised of a single processor or multiple processors. In multiple processor embodiments, the multiple processors may be of the same type, i.e. homogeneous, or may be of differing types, i.e. heterogeneous and may include any type of single or multi-core processors. This disclosure is equally applicable regardless of type and/or number of processors.

Display 504 may be any type of display including, but not limited to a cathode ray tube (CRT), a liquid crystal diode (LCD), or an organic light emitting diode (OLED). Display 504 may be incorporated into computing device 500 or may be peripherally connected to computing device 500 through any type of wired and/or wireless connection. This disclosure is equally applicable regardless of the type of display.

In embodiments, storage 508 may be any type of computer-readable storage medium or any combination of differing types of computer-readable storage media. Storage 508 may include volatile and non-volatile/persistent storage. Volatile storage may include e.g., dynamic random access memory (DRAM). Non-volatile/persistent storage may include, but is not limited to, a solid state drive (SSD), a magnetic or optical disk hard drive, flash memory, or any multiple or combination thereof.

In embodiments display orientation module 510 may be implemented as software, firmware, or any combination thereof. In some embodiments, display orientation module 510 may comprise one or more instructions that, when executed by processor(s) 502, cause computing device 500 to perform one or more operations of the process described in reference to FIG. 6, below, or any other processes described herein.

Figure 6:
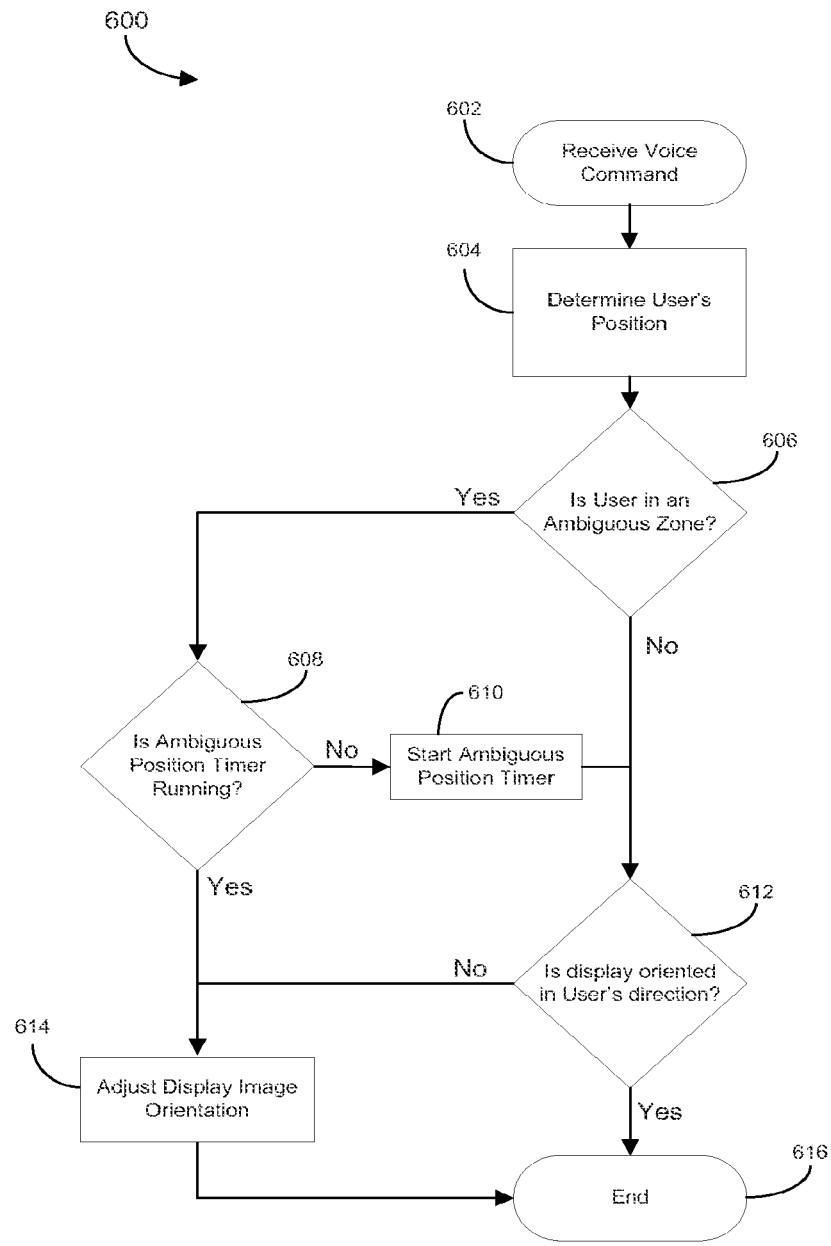
FIG. 6 depicts an illustrative process flow according to some embodiments of the present disclosure.

FIG. 6 depicts an illustrative process flow 600 according to some embodiments of the present disclosure. The process may begin at block 602 where a voice command is received from a user. Upon receiving the voice command, the user's position may be determined at block 604. As discussed above, the user's position may be determined via an analysis of audio streams captured by a microphone array, such as that depicted in FIGS. 1-3, 5 and 7. At block 606 a determination may be made as to whether the user is in an ambiguous zone or not. If the user's position is determined to be in an ambiguous zone the processing may go to block 608 where a determination is made as to whether an ambiguous position timer is running, such as that described in reference to FIG. 4 above. If an ambiguous position timer is running, then the process may proceed to block 614 where the display image orientation may be adjusted. In some embodiments, the adjustment at block 614 may be to a display image orientation adjacent to the current display image orientation and corresponding to an ambiguous zone adjacent to the previously determined ambiguous zone. Once the display image orientation is adjusted the process may end at block 616.

Returning to block 608, if an ambiguous position timer is not running the process may continue to block 610 where such a timer may be initiated. Once the ambiguous position timer is initiated the process may proceed to block 612 where a determination is made as whether the display image is currently oriented in the user's direction. If the display image is currently oriented in the user's direction the process may move on to block 616 where the process ends. If the display image is not currently oriented in the user's position the process may proceed to block 614 where the display image orientation may be adjusted in relation to the user's position.

After the display image orientation is adjusted based upon the user's position the process may proceed to block 616 where the process may end.

Going back to block 606, if the user's position is not determined to be in an ambiguous zone then the process may proceed to block 612 where a determination is made as to whether the display image is currently oriented in the user's direction. If the display image is currently oriented in the user's direction the process may move on to block 616 where the process ends. If the display image is not currently oriented in the user's direction the process may proceed to block 614 where the display image orientation may be adjusted in relation to the user's position. After the display image orientation is adjusted based upon the user's position the process may proceed to block 616 where the process may end.

In embodiments, process 600 may be implemented in hardware and/or software. In hardware embodiments, process 600 may be implemented in application specific integrated circuits (ASIC), or programmable circuits, such as Field Programmable Gate Arrays, programmed with logic to practice process 100. In a hardware/software implementation, process 100 may be implemented with software modules configured to be operated by the underlying processor. The software modules may be implemented in the native instructions of the underlying processor(s), or in higher level languages with compiler support to compile the high level instructions into the native instructions of the underlying processor(s).

In some embodiments, not pictured, a voice command may not be necessary to monitor the user's location. For instance the user may be able to issue a command, either by voice or manually, or modify a hardware or software setting such that the user's position is continuously calculated based upon audio input received from the user. In such embodiments, the user could walk around the display and have the display image continuously oriented based upon the user's position.

Figure 7:
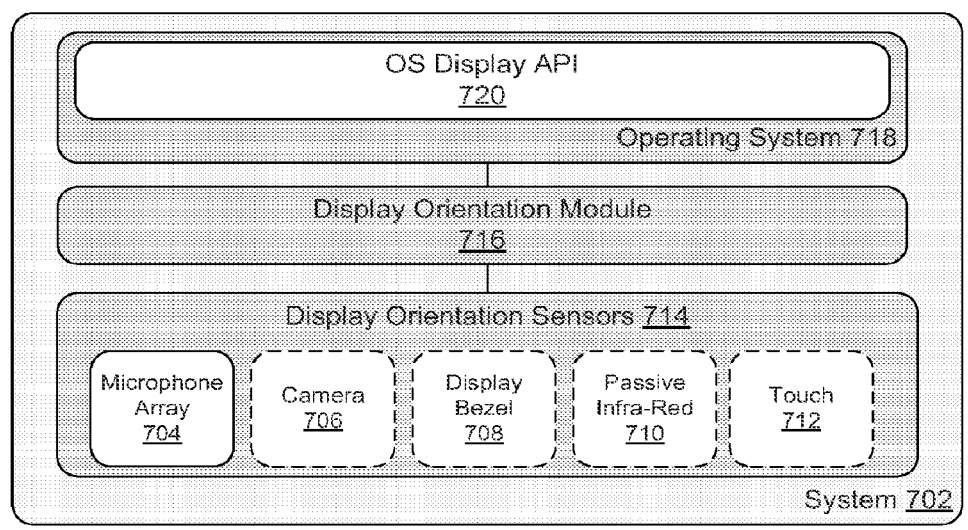
FIG. 7 depicts an illustrative system according to some embodiments of the present disclosure.

FIG. 7 depicts a system 702 according to some embodiments of the present disclosure. In embodiments, system 702 may be comprised of display orientation sensors 714, display orientation module 716, and Operating System (OS) 718 all coupled with one another. Display orientation sensors 714 may include a microphone array 704, such as, for example, microphone arrays discussed in reference to FIGS. 1-3 and 5, above. Display orientation sensors may also include optional sensors such as camera 706, display bezel sensor 708, passive infra-red sensor 710 and touch sensor 712. These optional sensors may be utilized, in some embodiments, to determine a display image orientation when no audio input is received or to determine an orientation of the display with respect to the user to aid in determining a display image orientation with respect to the user's position with respect to the display.

Display orientation module 716 may be configured to determine an appropriate display image orientation based upon one or more of the display orientation sensors 714. As discussed above, display orientation module 716 may be configured to determine a position of a user by analyzing audio streams captured by microphone array 704 and may take the position of the user into account when determining an appropriate display image orientation. Once an appropriate display image orientation is determined by display orientation module, the determination may be passed to the OS display API 720 to cause a display, not pictured, attached to system 702 to render an image in the determined appropriate display image orientation. In other embodiments, the display orientation module 716 may be configured to adjust the display image orientation directly, not depicted here.

For the purposes of this description, a computer-usable or computer-readable medium can be any medium that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

EXAMPLES

Some non-limiting examples are:

Example 1 is a computing device for computing, including orienting a display image, comprising: a display to render the display image; and a display orientation module coupled with the display to: receive audio input from a user of the computing device; determine a position of the user relative to the display, based on the audio input; and either orient the display image in accordance with the position of the user or output a result of the determination for use to orient the display image in accordance with the position of the user.

Example 2 may include the subject matter of Example 1, further comprising a microphone array coupled with the display orientation module, the microphone array including a plurality of microphones to individually capture respective audio streams, wherein the audio input from the user includes individual audio streams captured by the plurality of microphones of the microphone array.

Example 3 may include the subject matter of Example 2, wherein the microphone array is disposed on the computing device in an L shaped configuration.

Example 4 may include the subject matter of Example 2, wherein the display orientation module is to further analyze the individual audio streams of the audio input to determine the position of the user relative to the display.

Example 5 may include the subject matter of Example 4, wherein to analyze the individual audio streams includes at least one of: a determination of a delay, relative to each other, of the individual audio streams of the audio input; or a determination of a difference in amplitude, relative to each other, of the individual audio streams of the audio input.

Example 6 may include the subject matter of any one of Examples 1-5, wherein the audio input from the user includes a voice command given by the user and the display orientation module is to determine the position of the user relative to the display and either output the result of the determination to enable the display image to be oriented or orient the display image, in response to detection of the voice command.

Example 7 may include the subject matter of any one of Examples 1-5, wherein the display orientation module is to: further determine when the position of the user is in an ambiguous zone with respect to the display; and on determination that the position of the user is in an ambiguous zone with respect to the display, initiate an ambiguous position timer, wherein the ambiguous position timer is to execute for a predetermined period of time.

Example 8 may include the subject matter of Example 7, wherein the display orientation module is to: receive additional audio input from the user; determine a new position of the user relative to the display, based on the additional audio input; and either orient the display image to a display image orientation adjacent to the previous orientation or output a result of the determination for use to orient the display image to a display image orientation adjacent to the previous orientation, when both the new position of the user is an ambiguous zone with respect to the display and an ambiguous position timer is executing.

Example 9 is one or more computer-readable media having instructions stored thereon which, when executed by a computing device provide the computing device with a display orientation module to: receive audio input from a user, the audio input captured by a microphone array of the computing device; determine a position of the user, relative to a display of the computing device, based on the audio input; and either output a result of the determination for use to orient the display image in accordance with the position of the user or orient the display image in accordance with the position of the user.

Example 10 may include the subject matter of Example 9, wherein the microphone array is comprised of a plurality of microphones to individually capture respective audio streams, wherein the audio input from the user includes individual audio streams captured by the plurality of microphones of the microphone array.

Example 11 may include the subject matter of Example 10, wherein the plurality of microphones of the microphone array are disposed on the computing device in an L shaped configuration.

Example 12 may include the subject matter of Example 10, wherein the display orientation module is to further analyze the individual audio streams of the audio input to determine the position of the user relative to the display.

Example 13 may include the subject matter of Example 12, wherein to analyze the individual audio streams includes at least one of: a determination of a delay, relative to each other, of the individual audio streams of the audio input; or a determination of a difference in amplitude, relative to each other, of the individual audio streams of the audio input.

Example 14 may include the subject matter of any one of Examples 9-13, wherein the audio input from the user includes a voice command given by the user and the display orientation module is to determine the position of the user relative to the display and either output the result of the determination to enable the display image to be oriented or orient the display image, in response to detection of the voice command.

Example 15 is a computer-implemented method for computing, including orienting a display image, comprising: receiving, by a display orientation module of a computing device, audio input from a user, the audio input containing a voice command and the audio input captured by a microphone array; determining, by the display orientation module, in response to detection of the voice command in the audio input, a position of the user, relative to a display of the computing device, based on the audio input; and either orienting, by the display orientation module, the display image in accordance with the position of the user or outputting, by the display orientation module, a result of the determination to enable a display image to be rendered on the display in an orientation in accordance with the position of the user.

Example 16 may include the subject matter of Example 15, wherein the microphone array includes a plurality of microphones to individually capture respective audio streams and wherein the audio input from the user includes individual audio streams captured by the plurality of microphones of the microphone array.

Example 17 may include the subject matter of Example 16, wherein the microphone array is disposed on the computing device in an L shaped configuration.

Example 18 may include the subject matter of Example 16, further comprising analyzing, by the display orientation module, the individual audio streams of the audio input to determine the position of the user relative to the display.

Example 19 may include the subject matter of Example 18, wherein analyzing the individual audio streams includes at least one of: determining a delay, relative to each other, of the individual audio streams of the audio input; or determining a difference in amplitude, relative to each other, of the individual audio streams of the audio input.

Example 20 may include the subject matter of any one of Examples 15-19, wherein the audio input from the user includes a voice command given by the user and further comprising, determining, by the display orientation module, in response to detecting the voice command, the position of the user relative to the display and either orienting, by the display orientation module, the display image or outputting, by the display orientation module, the result of the determination to enable the display image to be oriented.

Example 21 may include the subject matter of any one of Examples 15-19, further comprising: determining, by the display orientation module, when the position of the user is in an ambiguous zone with respect to the display; and on determination that the position of the user is in an ambiguous zone with respect to the display, initiating, by the display orientation module, an ambiguous position timer, wherein the ambiguous position timer is to execute for a predetermined period of time.

Example 22 may include the subject matter of Example 21, further comprising: receiving, by the display orientation module, additional audio input from the user; determining, by the display orientation module, a new position of the user relative to the display, based on the additional audio input; and either orienting, by the display orientation module, the display image to a display image orientation adjacent to the previous orientation or outputting, by the display orientation module, a result of the determination for use to orient the display image to a display image orientation adjacent to the previous orientation, when both the new position of the user is an ambiguous zone with respect to the display and an ambiguous position timer is executing.

Example 23 is an apparatus for computing, including orienting a display image, comprising: displaying means for rendering the display image; and display orientation means for receiving audio input from a user of the apparatus; determining a position of the user relative to the display means, based on the audio input; and either orienting the display image in accordance with the position of the user or outputting a result of the determination for use to orient the display image in accordance with the position of the user.

Example 24 may include the subject matter of Example 23, further comprising means for individually capturing a plurality of audio streams, wherein the audio input from the user comprises the audio streams individually captured.

Example 25 may include the subject matter of Example 24, further comprising means for analyzing the individual audio streams of the audio input to determine the position of the user relative to the display.

Example 26 may include the subject matter of Example 25, wherein the means for analyzing the individual audio streams further comprise means for: determining a delay, relative to each other, of the individual audio streams of the audio input; or determining a difference in amplitude, relative to each other, of the individual audio streams of the audio input.

Example 27 may include the subject matter of any one of Examples 23-26, wherein the audio input from the user includes a voice command given by the user and the display orientation means further comprise, means for: determining in response to detecting the voice command, the position of the user relative to the display and either orienting the display image or outputting, by the display orientation module, the result of the determination to enable the display image to be oriented.

Example 28 may include the subject matter of any one of Examples 23-26, further comprising means for: determining, by the display orientation module, when the position of the user is in an ambiguous zone with respect to the display; and initiating, on determining that the position of the user is in an ambiguous zone with respect to the display, an ambiguous position timer, wherein the ambiguous position timer is to execute for a predetermined period of time.

Example 29 may include the subject matter of Example 28, further comprising means for: receiving additional audio input from the user; determining a new position of the user relative to the display, based on the additional audio input; and either orienting the display image to a display image orientation adjacent to the previous orientation or outputting a result of the determination for use to orient the display image to a display image orientation adjacent to the previous orientation, when both the new position of the user is an ambiguous zone with respect to the display and an ambiguous position timer is executing.

Example 30 is one or more computer-readable media having instructions stored thereon which, when executed by a computing device cause the computing device to perform the method of any one of Examples 15-22.

Example 31 is an apparatus comprising means for performing the method of any one of Examples 15-22.

What is claimed is:

1. A computing device for computing, including orienting a display image, comprising:
   one or more computing processors;
   physical memory coupled with the one or more computing processors;
   a display to render the display image; and
   a display orientation module to be loaded into the physical memory and executed by the one or more processors, and coupled with the display to:
      receive audio input from a microphone array to capture audio of a user of the computing device;
      determine a position of the user relative to the display, based on the audio input; and
      either orient the display image in accordance with the position of the user or output a result of the determination for use to orient the display image in accordance with the position of the user;
   wherein to determine a position of the user relative to the display, the display orientation module is to:
      determine when the position of the user is in an ambiguous zone with respect to the display; and
      on determination that the position of the user is in an ambiguous zone with respect to the display, initiate an ambiguous position timer, wherein the ambiguous position timer is to execute for a predetermined period of time.

2. The computing device of claim 1, further comprising a microphone array coupled with the display orientation module, the microphone array including a plurality of microphones to individually capture respective audio streams, wherein the audio input from the user includes individual audio streams captured by the plurality of microphones of the microphone array.

3. The computing device of claim 2, wherein the microphone array is disposed on the computing device in an L-shaped configuration.

4. The computing device of claim 2, wherein the display orientation module is to further analyze the individual audio streams of the audio input to determine the position of the user relative to the display.

5. The computing device of claim 4, wherein to analyze the individual audio streams includes at least one of:
   a determination of a delay, relative to each other, of the individual audio streams of the audio input; or
   a determination of a difference in amplitude, relative to each other, of the individual audio streams of the audio input.

6. The computing device of claim 1, wherein the audio input from the user includes a voice command given by the user and the display orientation module is to determine the position of the user relative to the display and either output the result of the determination to enable the display image to be oriented or orient the display image, in response to detection of the voice command.

7. The computing device of claim 1, wherein the display orientation module is to:
   receive additional audio input from the user;
   determine a new position of the user relative to the display, based on the additional audio input; and
   either orient the display image to a display image orientation adjacent to the previous orientation or output a result of the determination for use to orient the display image to a display image orientation adjacent to the previous orientation, when both the new position of the user is an ambiguous zone with respect to the display and an ambiguous position timer is executing.

8. The computing device of claim 1, wherein the microphone array has at least three microphones arranged in an L-shaped, fixed position.

9. One or more non-transitory computer-readable media having instructions stored thereon which, when executed by a computing device provide the computing device with a display orientation module to:
   receive audio input from a user, the audio input captured by a microphone array;
   determine a position of the user, relative to a display of the computing device, based on the audio input; and
   either output a result of the determination for use to orient the display image in accordance with the position of the user or orient the display image in accordance with the position of the user;

wherein to determine a position of the user relative to a display of the computing device comprises to:
    determine when the position of the user is in an ambiguous zone with respect to the display; and
    on determination that the position of the user is in an ambiguous zone with respect to the display, initiate an ambiguous position timer, wherein the ambiguous position timer is to execute for a predetermined period of time.

10. The non-transitory computer-readable media of claim 9, wherein the microphone array is comprised of a plurality of microphones to individually capture respective audio streams, wherein the audio input from the user includes individual audio streams captured by the plurality of microphones of the microphone array.

11. The non-transitory computer-readable media of claim 10, wherein the plurality of microphones of the microphone array are disposed on the computing device in an L-shaped configuration.

12. The non-transitory computer-readable media of claim 10, wherein the display orientation module is to further analyze the individual audio streams of the audio input to determine the position of the user relative to the display.

13. The non-transitory computer-readable media of claim 12, wherein to analyze the individual audio streams includes at least one of:
    a determination of a delay, relative to each other, of the individual audio streams of the audio input; or
    a determination of a difference in amplitude, relative to each other, of the individual audio streams of the audio input.

14. The non-transitory computer-readable media of claim 9, wherein the audio input from the user includes a voice command given by the user and the display orientation module is to determine the position of the user relative to the display and either output the result of the determination to enable the display image to be oriented or orient the display image, in response to detection of the voice command.

15. The one or more non-transitory computer readable media of claim 9, wherein the microphone array has at least three microphones arranged in an L-shaped, fixed position of the computing device.

16. The one or more non-transitory computer readable media of claim 9, wherein the instructions further comprise:
    receive additional audio input from the user;
    determine a new position of the user relative to the display, based on the additional audio input; and
    either orient the display image to a display image orientation adjacent to the previous orientation or output a result of the determination for use to orient the display image to a display image orientation adjacent to the previous orientation, when both the new position of the user is an ambiguous zone with respect to the display and an ambiguous position timer is executing.

17. A computer-implemented method for computing, including orienting a display image, comprising:
    receiving, by a computing device, audio input from a user, the audio input containing a voice command and the audio input captured by a microphone array;
    determining, by the computing device, in response to detection of the voice command in the audio input, a position of the user, relative to a display of the computing device, based on the audio input; and
    either orienting, by the computing device, the display image in accordance with the position of the user or outputting, by the display orientation module, a result of the determination to enable a display image to be rendered on the display in an orientation in accordance with the position of the user;
    wherein determining, by the computing device, a position of the user, relative to a display of the computing device comprises:
    determining, by the computing device, when the position of the user is in an ambiguous zone with respect to the display;
    on determination that the position of the user is in an ambiguous zone with respect to the display, initiating, by the computing device, an ambiguous position timer, wherein the ambiguous position timer is to execute for a predetermined period of time.

18. The computer-implemented method of claim 17, wherein the microphone array includes a plurality of microphones to individually capture respective audio streams and wherein the audio input from the user includes individual audio streams captured by the plurality of microphones of the microphone array.

19. The computer-implemented method of claim 18, wherein the microphone array is disposed on the computing device in an L-shaped configuration.

20. The computer-implemented method of claim 18, further comprising analyzing, by the computing device, the individual audio streams of the audio input to determine the position of the user relative to the display.

21. The computer-implemented method of claim 20, wherein analyzing the individual audio streams includes at least one of:
    determining, by the computing device, a delay, relative to each other, of the individual audio streams of the audio input; or
    determining, by the computing device, a difference in amplitude, relative to each other, of the individual audio streams of the audio input.

22. The computer-implemented method of claim 17, wherein the audio input from the user includes a voice command given by the user and further comprising, determining, by the computing device, in response to detecting the voice command, the position of the user relative to the display and either orienting, by the computing device, the display image or outputting, by the computing device, the result of the determination to enable the display image to be oriented.

23. The computer implemented method of claim 17, further comprising:
    receiving, by the computing device, additional audio input from the user;
    determining, by the computing device, a new position of the user relative to the display, based on the additional audio input; and
    either orienting, by the computing device, the display image to a display image orientation adjacent to the previous orientation or outputting, by the computing device, a result of the determination for use to orient the display image to a display image orientation adjacent to the previous orientation, when both the new position of the user is an ambiguous zone with respect to the display and an ambiguous position timer is executing.

24. The computer implemented method of claim 17, wherein the microphone array has at least three microphones arranged in an L-shaped, fixed position.

* * * * *